Oct. 25, 1966     J. R. BAILEY ETAL     3,281,544
PUSH ROD MECHANISM WITH ACCUMULATIVE LOCK APPARATUS
Filed Nov. 20, 1964     6 Sheets-Sheet 1

Inventors:
James R. Bailey
and Vernon W. Lavigne
BY Robert L. Kahn ATTY

Inventors:
James R. Bailey
and Vernon W. Lavigne
BY Robert L. Kahn ATTY

United States Patent Office 3,281,544
Patented Oct. 25, 1966

3,281,544
PUSH ROD MECHANISM WITH ACCUMULATIVE LOCK APPARATUS
James R. Bailey, Chicago, and Vernon W. Lavigne, Rolling Meadows, Ill., assignors to Switchcraft, Inc., Chicago, Ill., a corporation of Illinois
Filed Nov. 20, 1964, Ser. No. 412,746
18 Claims. (Cl. 200—5)

This invention relates to push rod mechanism and particularly to multiple push rod mechanism having desirable physical and functional characteristics. Each push rod of the push rod mechanism to be disclosed may be actuated in either direction by a button or by a lever and the invention makes possible various functional interrelations between the individual rods.

Push rod mechanisms have wide application in various types of mechanical devices, such as electrical switching, various communication and instrument gear, computer and similar office equipment devices, and devices which are primarily mechanical in nature but are actuated by push buttons or levers. The greatest field of application of the push rod mechanism embodying the present invention, however, resides in complex electrical switching and, for convenience and illustrative purposes, the invention will be described in such connection.

It is well known that for electrical switching purposes, it is highly desirable to provide a plurality of push rods and provide control means for such push rods whereby various functional relationships between the individual push rods may be established or maintained. Thus a common example is the use of multiple push button switching in a switch panel wherein a push button, when depressed, will be so interlocked with remaining push buttons of the panel as to cause one or more of such remaining push buttons to be unlocked. Other functional relationships that may be desirable to establish are to have one or more push buttons mechanically independent of the others but to be unlocked when other push buttons are operated.

Still additional functional relationships between various push buttons that may be desired involve the successive locking in down position of one or more push buttons to be released when a particular release push button is operated.

Push button mechanisms and electrical switch gear operated by such mechanism have been highly developed and are widely used. However, one serious drawback of such prior mechanism has involved timing. This is the relationship in an interlock system between the rod being depressed from a normal up position and release of previously locked rods. In prior mechanism, latch bars have been used. As a result, a rod being depressed will release previously locked rods prior to establishing conditions for keeping the first named rod depressed or locked in a down position. In other words, a small down movement of one button can release previously locked rods and the one button itself can be left unlocked. Thus improper and incomplete rod operation can change its normal interlock action to an unexpected and undesired pure release function.

Another serious drawback of many push rod operated electrical switch gear resides in the fact that once a complete switch mechanism and push rod combination have been assembled, it has been difficult and in many cases impossible to change switch contact patterns.

The amount of room and space required by push rod mechanism is quite important for the reason that most push rod mechanisms are generally designed for panel mounting. In many instances, the available space in a panel is greatly restricted by the presence of so many control and indicating means. In addition, the space behind the panel must be readily available for wiring. It is evident, therefore, that the panel area, as well as the space in back of the panel, is at a premium and that the equipment for panel mounting should be as compact as possible, should be easily installed, removed or replaced, should be easy to wire, and should have a high degree of functional flexibility and versatility.

Insofar as electrical switching is concerned, the present invention permits individual push rods to have individual switch banks which may be easily applied, removed or replaced to provide any desired switching function at any time during or after assembly. This can be done without removal of an entire push button mechanism from a panel and thus makes it possible to service or change the switching pattern of push button operated switches embodying the present invention without in any way disturbing the switch banks of push buttons which are not affected. Such an advantage improves the versatility of the mechanism embodying the present invention so that switching changes are possible without change in the mechanism or changes in the mounting of the mechanism.

An additional advantage of the mechanism embodying the present invention resides in the fact that additional switch banks or push rod banks may be provided and fitted in with a minimum of trouble. The high degree of compactness of the push button mechanism embodying the present invention makes for all practical purposes as the limiting factor the front area of the face of a push button or the amount of space required for an operating lever in front of the panel.

Of particular importance in the invention is the use of circular discs in combination with push rod active portions determining the functional inter-relationship of the push rods. The use of discs to cooperate with rods for lock-out is well known. In such cases, however, the movement of such discs has been effected by the thickness of the push rod material, just enough lost motion being provided among the discs so that only one push rod can enter between two adjacent discs at any one time. The present invention, however, utilizes an entirely different concept. The discs are disposed to cooperate with active ends of push rods, having shapes which determine the response of the discs to push rod movement.

This cooperation is made possible because the push rods are oriented so that the thickness of a push rod dimension is parallel with the thickness dimension of each of the cooperating discs. In prior devices, the thickness of a push rod has been perpendicular to the thickness of discs, with the result that it was the thickness of a push rod between two adjacent discs that was effective. However, the present invention changes this relative orientation of push rod and disc and makes it possible to achieve varied functional effects by controlling not only the extent of travel of a push rod, but also the shape of the end of a push rod where discs are engaged. In fact, the invention changes the functioning of the discs from simple rollers to cam followers and changes the shapes of the operating portions of push rods so that such shapes become cam surfaces. As a result, varied and numerous responses are possible, thus making for a construction which is highly versatile and effective.

Another important feature of the present invention resides in the means for definitely establishing an *in* or *out* position for a push rod. For convenience, a normal rod position will be designated as *up* or *out* position. As a rule, prior devices have utilized latch bars for determining a definite *in* or *out* position of a push rod. This has made proper timing impossible to achieve, since the latch bar had to release prior to re-locking a push rod. In accordance with the invention, separate curved C or V-shaped springs are provided and are so-shaped and arranged as to provide an over-center action. Preferably, each push rod is provided with a pair of such over-center springs, there being one on each side. The arrangement of such springs is such that the push rod is balanced insofar as lateral forces are concerned. Such springs are light, easily installed, and in the new construction are substantially protected. In addition, these springs take little room and provide push rod timing control and accurate rod loading.

A structure embodying the present invention makes possible the use of generally conventional contact leaf-type springs which may be carried by a stack consisting of contact leaves and intervening insulating spacers. The entire stack of spacers and leaves is conventional in construction except that the size is proportioned to the requirements of a switch. The stack is carried by a bracket which may be readily applied to or removed from the switch frame at the rear edge. It is possible in a structure embodying the present invention to provide contact leaf stacks on opposite sides of the switch frame and provide as many leaves as desired.

For a complete disclosure of the invention, reference will now be made to the drawings wherein.

Before describing the invention in detail, various functional possibilities will be defined. For example, interlock permits one push rod to be depressed to an *in* position from a normal *out* position and, at the same time, automatically restores to normal position the associated push rod which had been in a *down* or *in* position. The interlock thus permits release of a depressed push rod. If the mechanism is so arranged, as will be later described, several rods can be in the *down* position, to be released by an additional button, then such action is designated as "accumulative lock." In an accumulative lock condition where more than one push rod is locked to a *down* or an *in* position, the release may be accomplished by a special release button.

The mechanism embodying the invention provides lockout with interlock without any structural changes. This is in marked contrast to prior mechanisms.

It is also possible with this new mechanism to have non-lock action wherein a push rod has no effect on other push rods. The invention makes possible a bank of push rods wherein some push rods are interlocked and others have no lock or may have accumulative lock.

Referring first to the mechanism illustrated in FIGURES 1 to 14 inclusive, there is shown, merely by way of example, a push rod mechanism having seven push button stations. In practice, the number of stations that can be accommodated is limited only by frictional effects between the push rod and the various disc means to be described for providing different push rod functions. Thus it will be understood that the seven stations are merely by way of example and that the stations can be decreased or increased in number.

Figure 1:
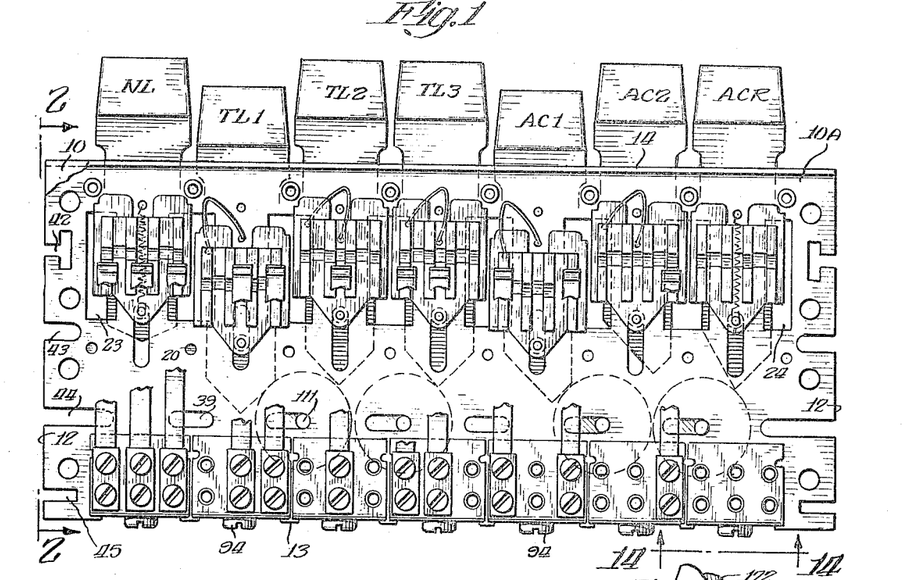
FIGURE 1 is a side elevation of push rod mechanism embodying the present invention, certain parts being broken away for illustrative purposes.
Figure 2:
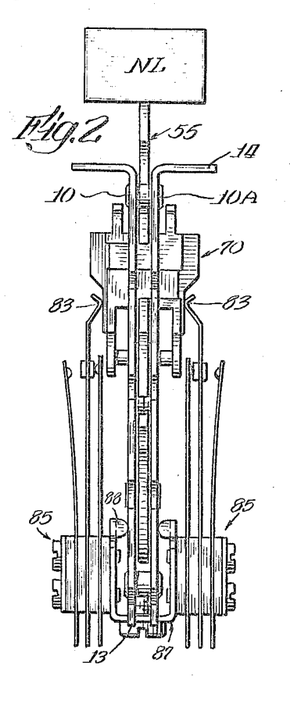
FIGURE 2 is an end view along line 2—2 of FIGURE 1.
Figure 3:
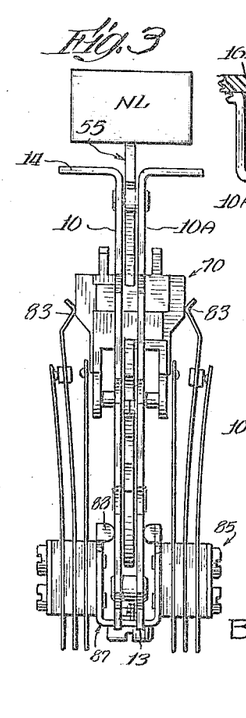
FIGURE 3 is a view similar to FIGURE 2 except that the push rod is illustrated as being in the *down* or *in* position as distinguished from the *up* or *out* position shown in FIGURE 2.

The seven stations illustrated include a non-locking push rod, indicated by NL. This non-locking station is simply a push rod which is distinct from the remaining push rod mechanisms and does not remain in an *in* position but returns to its normal *out* or *up* position, as illustrated in FIGURE 1, for example. It should be understood that this NL station may be disposed anywhere along the line of stations.

There are three stations indicated by TL1; TL2 and TL3, which are interlocked with each other. There may be any desired number of such interlocked stations.

An additional and separate group of stations consists of accumulative lock stations AC1 and AC2 and an accumulative lock release ACR. Again there may be any number of accumulative lock stations. Functionally, the interlock group of stations (TL1 to TL3 inclusive) are separate from the accumulative lock group of stations AC1 and AC2. As will be apparent later in connection with the mechanism illustrated in FIGURE 17, these two groups of stations need not be functionally distinct and unrelated.

The general push rod and frame mechanism for all the stations is the same, unless noted otherwise, and it will be understood, therefore, that the description with reference to any one station is equally applicable to other stations except where specifically noted otherwise.

The entire push rod mechanism is carried by and disposed between two generally flat frame plates 10 and 10A which are stampings and are identical. It will therefore be necessary only to describe one of these frame plates in detail. The plates themselves are of suitably rigid material such as sheet steel and may be made in any desired lengths. A plate consists of a frame body having ends 12 and bottom or rear edge 13 and having flange 14 at the top or front of the frame. Frame plates 10 and 10A, when assembled to make a frame, have their flanges 14 extending away from each other. Flanges 14 may have any desired width and may be provided with suitable mounting apertures for mounting the entire structure in a panel or the like. Furthermore, flanges 14 extending on opposite sides provide an overhanging ledge for the entire mechanism, which is convenient in handling, packaging, or even mounting the entire mechanism.

The pair of frame plates 10 and 10A are disposed in opposed relation, with the separation therebetween somewhat greater than the thickness of the plate material. In practice, the various components of the mechanism which are disposed between frame plates 10 and 10A will usually have about the same thickness as the frame plates so that the spacing between opposed plate faces can be between one and two times the thickness of a frame plate.

A pair of frame plates 10 and 10A are rigidly secured together at apertures 15 by suitable means such as, for example, rivets 16 having enlarged spacing collar portions 17 which function to maintain the spacing between plates 10 and 10A wherever such rivets are used. In addition, plates 10 and 10A are provided with inwardly directed embossings 20 which function to maintain the desired spacing between the opposed faces of plates 10 and 10A. As many embossings may be provided as desired.

A frame plate has narrow windows 23 and 24 at the two ends thereof and also has a series of what might be termed double width windows 26 between adjacent push rod stations. Rivet apertures 15 are disposed adjacent bottom edge 13 of a frame plate and near the top of the frame plate adjacent flange 14 to accommodate rivets 16. The number and location of the rivet apertures may be varied to suit requirements.

A frame plate additionally has elongated guide slots 33 which extend transversely of a frame plate in a direction between flange 14 and bottom edge 13. Each push rod station is provided with elongated slots 33 and these slots are so disposed as to be midway between adjacent windows 23 and 26 or 26 and 26 for various push button positions. The transverse position of elongated slots 33 is such that the top end 34 of slot 33 is disposed somewhat above the bottom aligned edges of the windows while bottom edge 35 of the slot is disposed somewhat below embossings 20 extending across the entire length of a frame plate. It is understood that embossings 20 are repeated for each push button station.

Elongated slots 39 are disposed along a line extending lengthwise of the plates; that is, along the line between ends 12 of each frame plate. Slots 39 are disposed below the bottom ends of elongated slots 33 and above the line of rivet holes adjacent bottom edge 13 of the frame plate. Each push rod station is provided with a pair of slots 39, the arrangement being such that each slot 39 is disposed below the windows corresponding to a particular push rod location. The length of the slots and the exact location will be determined by geometrical conditions, to be described, in connection with the discs. Each frame plate has end edge 12 also provided with slots 42, 43, 44 and 45 for purposes of adapting the entire frame structure to various kinds of mountings. Slot 44 is in line with the series of slots 39, while the location of the remaining slots is generally as illustrated in the drawings.

Bottom edge 13 of the frame plates is cut inwardly at 47 as illustrated and has outwardly disposed embossed portion 48. Cut-out portion 47 and embossed portion 48 occur at each push rod station and are provided in connection with the mounting of contact leaf stacks, to be described.

Slidably disposed between the frame plates at each push rod station is a push rod, generally indicated by 55. Push rod 55 has button mounting end portion 56 at the top and the entire push rod is preferably of flat steel stock having a thickness permitting the same to slide smoothly between the frame plates. Each push rod has its thickness perpendicular to the planes of the frame plates so that the thickness of a push rod and the thickness of the frame plates are along parallel lines. Each push rod 55 has irregular side edges 58 provided with shoulders 59, 60 and 61. In addition, each push rod 55 has elongated slot 63 disposed along the center of the push rod longitudinally thereof and symmetrically between the rod sides. The width of a push rod, this being the distance across from the shoulders on opposite sides of a rod, is sufficient so that the shoulders and part of the adjacent edge body portion of a push rod will be visible through the windows on opposite sides of the frame plate portion separating adjacent windows. Each push rod is provided with apertures 65 and 66 on opposite sides of elongated slot 63 and adjacent shoulders 60.

The dimensions of a push rod are such that in the *up* position, the top of shoulder 61 will be stopped by the rivets in apertures near flanges 14 of the frame plate. Carried by each push rod on each side thereof is cam block 70 having arm portions 71 and 72. Arm portions 71 and 72 are offset from each other longitudinally of the rod and are so dimensioned that two blocks 70 on opposite sides of a push rod can fit between shoulders 59 and 60 on each edge of a push rod. By suitable dimensions of the parts, a locking fit may be established.

The cam blocks on opposite sides of a push rod are identical. They can be of metal or, preferably, of plastic, and if of plastic, can be of nylon or Teflon or any other plastic which is sufficiently strong and over which metal can slide rather easily. It will be noted that offset arms 71 and 72 have slots 74 therein for engaging the edge of the metal of the push rod. Thus the cam blocks can be sprung into position. It is understood, however, that if necessary a cam block may be provided for only one side of a push rod. The dual arrangement illustrated is preferred.

Each cam block 70 has cam portion proper 76 and has drive portion 77 provided with aperture 78 which will register with elongated guide slot 33 in the frame plates. Disposed in aperture 78 of the cam blocks and riding in elongated guide slot 33 at each rod station is guide pin 80 having reduced portions 81 and 82 at each end thereof for fitting in aperture 78 of the cam block. Guide pin 80 rides in elongated slot 33 of the frame plate.

Cam block portion 76 is so shaped as to cooperate with ends 83 of contact leaf stack, generally indicated by 85. The contact leaf stack may be of any desired construction and may have any desired contact arrangement, and the arrangement illustrated in the drawing is purely for purposes of ilustration. Each contact stack 85 is bolted to U-shaped bracket 87 which is adapted to extend around the outside of frame plates 10 and 10A. Each push rod station has its own individual bracket 87 and the bracket is so arranged that fingers 88 extending inwardly toward each other function to space sides 90 of the bracket from the outer faces of the frame plates to accommodate the enlargement of embossings 48.

Bight porton 92 of a bracket is provided with aperture 93 for accommodating screw 94 which is threaded into the space between embossings 48 of a pair of frame plates. Screw 94 may be of the self-tapping variety. Plate embossings 20 prevent the frame plates from buckling toward each other in the regions of the discs when screws 94 are applied.

It is clear that a bracket may carry as many contact stacks on each side 90 thereof as desired and in this particular instance, the stacks are so proportioned that three separate stacks may be bolted side-by-side to one arm 90 of a bracket. The cam portion of cam block 70 may have different cam shapes to accommodate different leaf ends for a stack for obtaining a desired switch action. From the ribbed structure of the cam block portion 76, separate and independent cam actions for each switch stack are obtainable.

It will be evident that the terminal portions of the various contact leaves extend beyond the stack away from the contact leaf portions, this generally being conventional, thus providing wiring opportunities for a stack or multiplicity of stacks at any time.

Returning to the push rods, individual push rods for most part, but not always, are provided with active end portions 100. In the case of section NL, the push rod is shortened so that it does not have any active portion. In such case, a push rod will have no effect on other push rods. However, push rods which have active portions 100 have generally sharp tips 102 with tapering cam edges extending toward the sides of the push rod. For example, the push rod illustrated in FIGURE 13 has two cam edges 103 and 104 extending longitudinally toward the sides of the push rod. In this particular instance, cam edges 103 and 104 are symmetrical with respect to tip 102, and for most efficient action, the angle between cam edges 103 and 104 can be 90°. The cam edges may be straight, although for certain special purposes there may be instances where curvature may be desirable. It may be observed that stations TL1, TL2 and TL3 are each provided with push rods similar to the rod illustrated in FIGURE 13, insofar as the cam edges are concerned.

Stations AC1, AC2 and ACR have their individual push rods provided with non-symmetrical active cam edges of the shape shown in FIGURES 1, 4 and 5 and described in detail later.

At appropriate slots 39 in the frame plates, there are mounted discs 110. Each disc 110 is provided with a small axle or pin 111 which extends into elongated slot 39 of the two frame plates. It is understood that a disc is small enough so that it can move along the length of elongated slot 39 but is restrained from movement laterally of slot 39. The location of slots 39 and the diameter of disc 110 is such that it is possible for adjacent discs 110 (FIGURE 5, for example) to be tangent to each other. It is also possible for adjacent discs to be separated from each other (FIGURE 4), axles 111 of adjacent discs in such position being at the furthest ends of adjacent slots 39. The dimensions of slot 39, together with the diameter of disc 110 and the width of the active portions of the push rod, are such that the active portion for the push rod corresponding to station TL2, for example, is such that in the *down* position of the rod, adjacent discs 110 will be separated maximum amount. Furthermore, the active portions of push rods for buttons TL1 and TL3 will be forced upwardly (only one can be down at any one time) when TL2 is pushed down. Thus an interlock action is obtained. It is clear that any number of adjacent cooperating discs can be used.

The cam action—the interaction between the cam edges of the active push rod portion and the edges of the discs—can be rendered more efficient by insuring a smooth surface for the edges of the cam discs and the cam edges for the push rods. To this end, it is desirable to have these opposing and cooperating edges of material which can slide easily with respect to each other and will not bind.

It will be noted that there is no disc for disc axle slot 39 at button NL. This is because the push rod for NL is functionally separate from the remaining push rods and a disc would be unnecessary. However, if NL were located between TL1 and TL2, then a disc would be necessary to connect TL1 and TL2 even though NL does not require a disc.

It is evident that insofar as buttons TL1, TL2 and TL3 are concerned, pushing down either one of these three buttons will unlock any other down button in this particular group. In order to separate this particular interlock group, TL1 to TL3 inclusive, from the next group AC1, AC2 and ACR, it is only necessary to omit a disc between these two groups. Thus there will be no interaction between the push rods for the TL stations on the one hand and the AC stations on the other hand.

Referring now to buttons AC1, AC2 and ACR, it will be noted that the active portion of the push rod for AC1, for example, has tip 120 non-symmetrically disposed with respect to the sides of the push rod. From tip 120, cam edges 121 and 122 extend toward the rod sides. These two cam edges are non-symmetrical and are unequal in length. Cam edge 121 is non-functional, but cam edge 122 cooperates with the adjacent disc 110 so that when AC1 is down, the corresponding disc 110 is moved to the right (FIGURE 4).

The push rod active portion for button AC2 is provided with a similar cam portion whose shape is the same as that of button AC1. It is evident from the geometry of these two active push rod portions that the discs cooperating with these two push rod portions can assume the position illustrated in FIGURE 4, this corresponding to the *down* position of buttons AC1 and AC2.

Referring now to button ACR, it will be noted that this has a push rod whose cam shape is somewhat different from the cam edges for AC1 and AC2. The push rod for ACR has tip 130 with cam sides 131 and 132. This particular push rod has its active portion so shaped that tip 130 is substantially half-way between the sides of the rod, but it is clear that the angles of cam edges 131 and 132 are different. In this particular instance, cam edge 132 in non-functional and cam edge 131 is so arranged that upon downward movement of button ACR, the disc contacted by cam edge 131 will be moved to the left as seen in FIGURES 4 and 5, thus displacing the adjacent discs and forcing buttons AC1 and AC2 up, as illustrated in FIGURE 5.

It is clear that as many buttons corresponding to AC1 and AC2 may be disposed in proximity to each other as may be desired and that all such accumulative lock buttons will be released by the action of end button ACR. In such an arrangement, it will be necessary for the release button to have the active rod portion on the outside of the end disc. The number of accumulative buttons which can be thus operated will be limited principally by the frictional load in connection with moving the various discs and releasing the various push rods. While only two accumulative buttons are shown—AC1 and AC2—it is possible to have a larger number than this with one release button.

Buttons NL and ACR are both of the type which normally have an *up* position and have no means for maintaining either of such buttons in a *down* position. Button NL may, if desired, have a push-push action where one push locks it down and another push releases, as disclosed in copending application Serial No. 184,236, now Patent No. 3,165,612, assigned to the instant assignee. The push rods for these two buttons are biased upwardly by coil springs 137, there being a coil spring on each side of the frame. It is understood, however, that only one coil spring per push rod may be used. A pair, each on opposite sides of the frame, is preferred, however, to balance the push rod operation. Thus the bottom of coil spring 137 has its end looped around the projecting end of pin portion 81 which passes through cam block aperture 78. The upper portion of coil spring 137 is looped through suitable apertures in the frame plate, as illustrated for example in FIGURE 12. Springs 137 tend to urge the push rod up and since there is nothing to maintain the push rod in the *down* position, it is clear that the end push rods as illustrated in FIGURES 1, 4 and 5 will be normally biased upwardly. Against this bias, an operator may push such push buttons down and upon release, the push button will assume its normal upwardly biased position. Anchor portion 138 at the top of helical coil spring 137 can pass through push rod aperture 63 and the push rod can move up and down freely, as far as end 138 is concerned.

Figure 4:
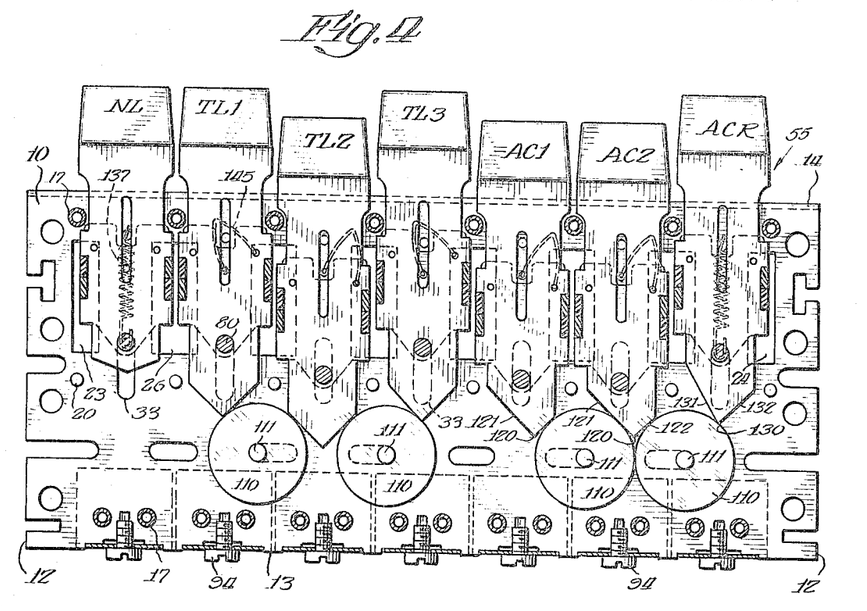
FIGURE 4 is a side elevation generally similar to FIGURE 1 but showing the push rods positioned differently to illustrate the functioning of the mechanism.
Figure 5:
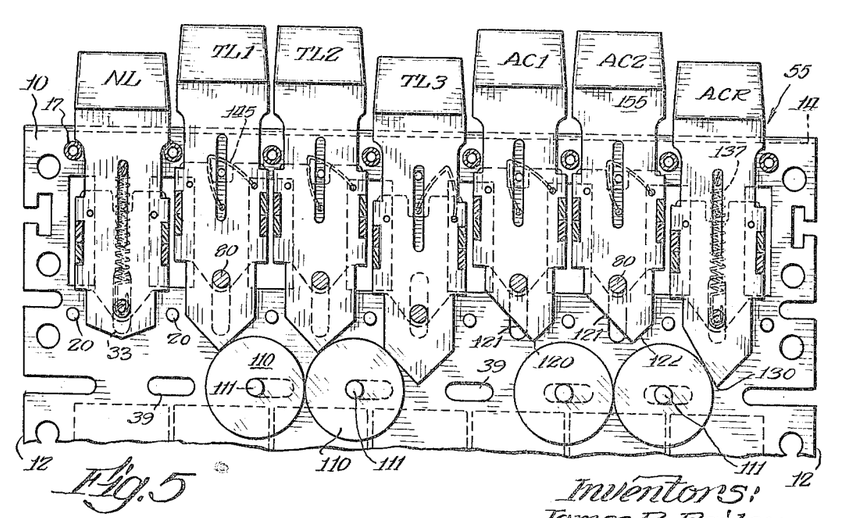
FIGURE 5 is a side elevation generally similar to FIGURES 1 and 4, but showing the push rods in a still different position.
Figure 6:
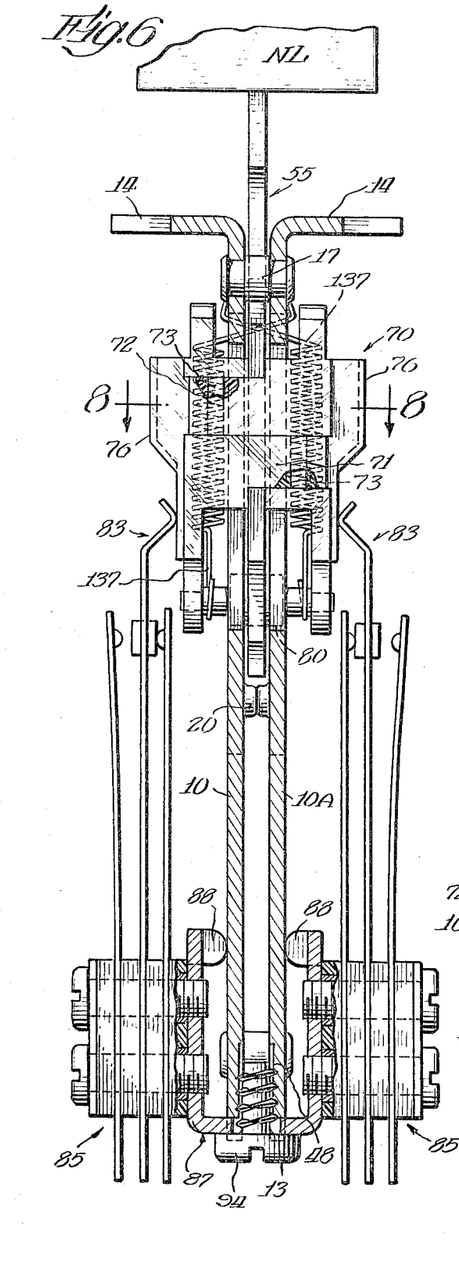
FIGURE 6 is an end view on a larger scale showing the details of the end station of the mechanism illustrated in FIGURE 1.
Figure 7:
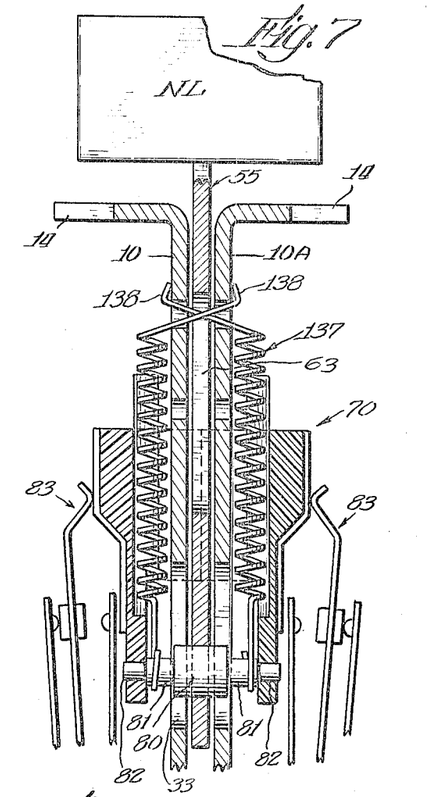
FIGURE 7 is an enlarged view of the mechanism illustrated in FIGURE 6, but showing the push rod in a *down* or *in* position.
Figure 8:
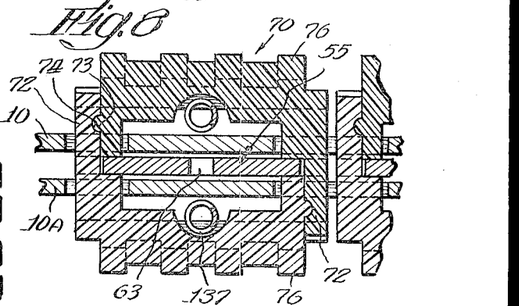
FIGURE 8 is a sectional detail on line 8—8 of FIGURE 6.
Figure 9:
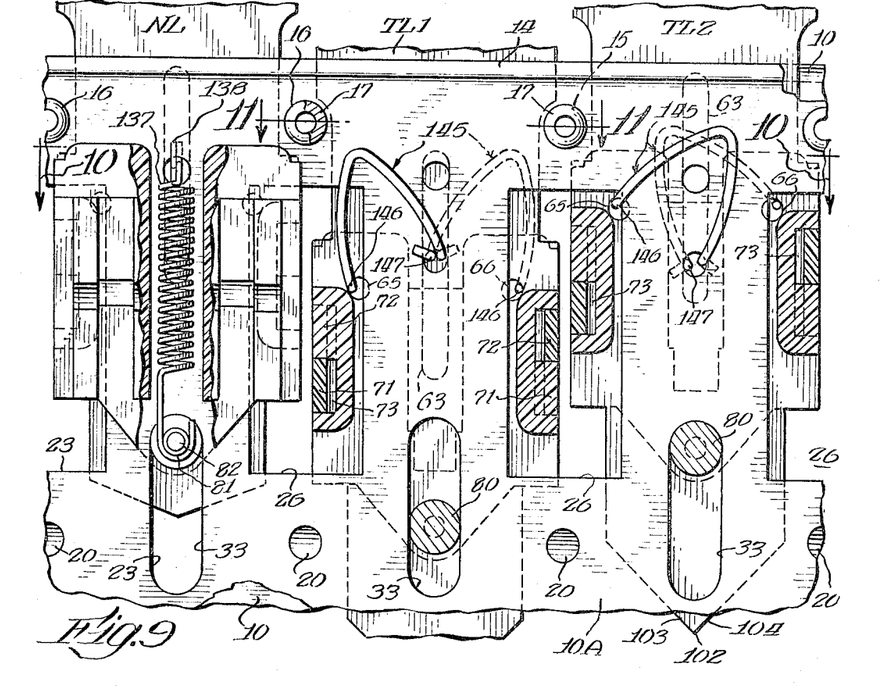
FIGURE 9 is a side elevation on an enlarged scale of a portion of the push rod stations of FIGURE 1 illustrating the spring bias means of the various push rods.
Figure 10:
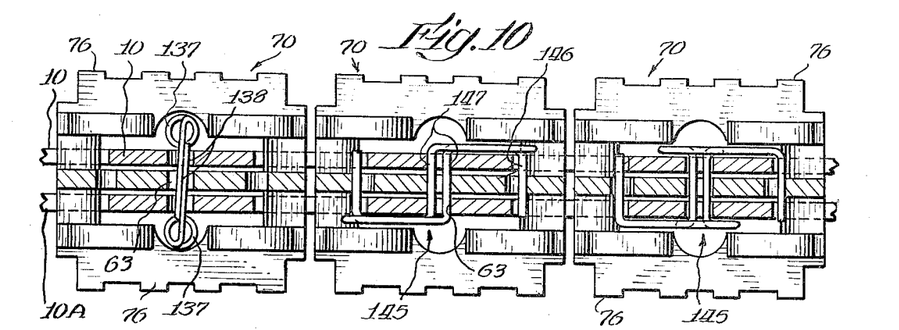
FIGURE 10 is a sectional detail on line 10—10 of FIGURE 9.
Figure 11:
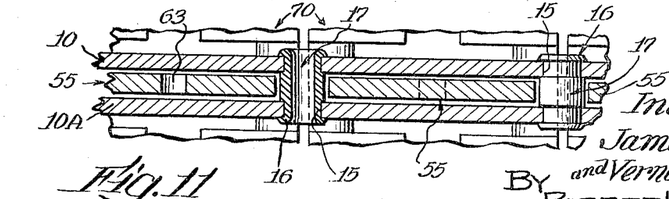
FIGURE 11 is a sectional detail on line 11—11 of FIGURE 9.
Figures 12, 13, 14:
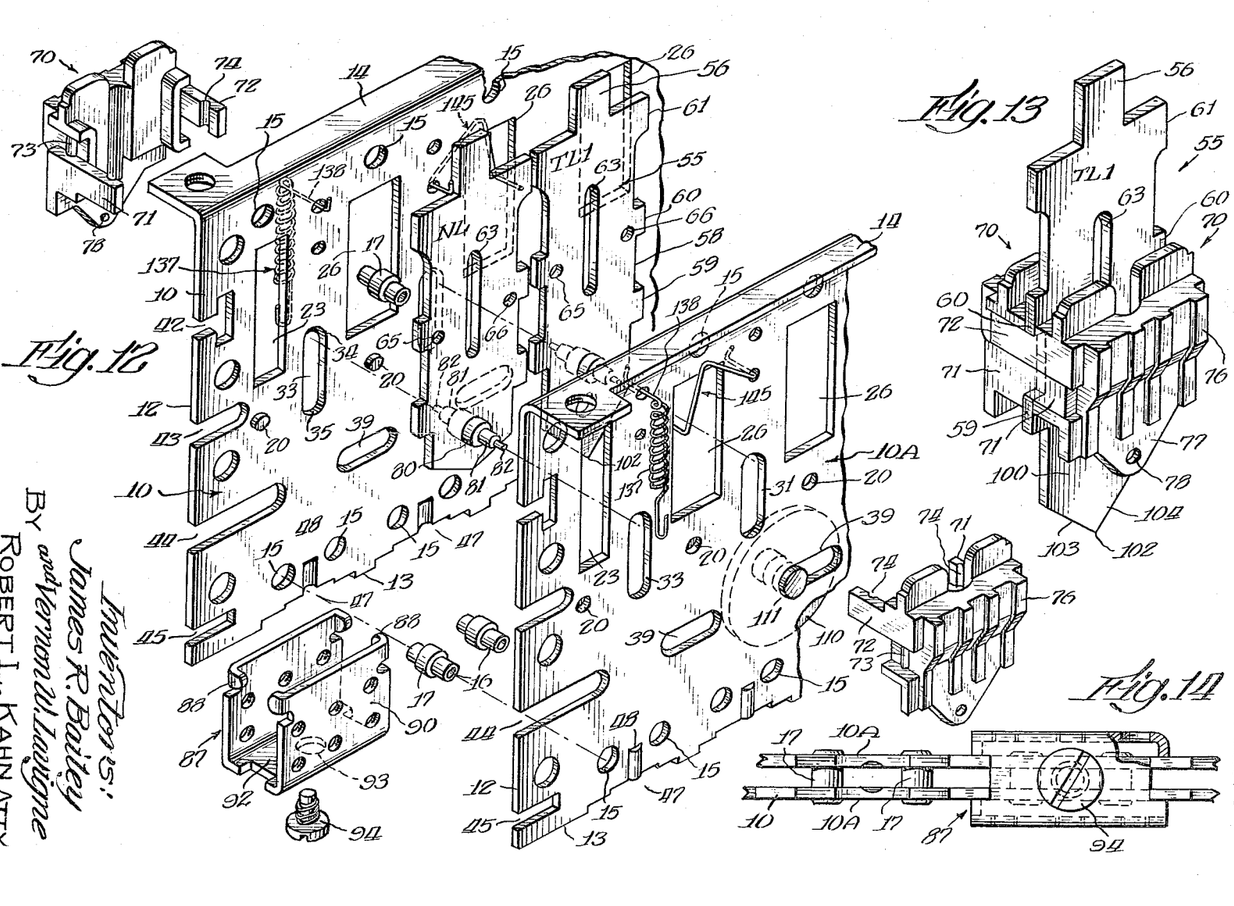
FIGURE 12 is an exploded perspective view of a portion of the mechanism illustrated in FIGURE 1 to more clearly show on a larger scale the frame plates, push rod mechanism and various other features.
FIGURES 13 and 14 are respectively details on a larger scale than FIGURE 12 of certain portions of the mechanism, FIGURE 14 being taken on line 14—14 of FIGURE 1.

The remaining push buttons in the mechanism, illustrated in FIGURES 1, 4 and 5, are provided with means for normally biasing a push rod either in an *up* or *down* position. This means assumes a simple form of a generally V-shaped over-center type of spring 145 having free ends 146 and 147 extending through suitable apertures in the movable push rod portion and stationary frame portions respectively. As illustrated in FIGURE 10, end portion 147 of an over-center spring extends through registering apertures in the two frame plates and also passes through elongated slot 63 of a push rod. Over-center spring end portions 146 extend through apertures 65 and 66 of a push rod and is free of the frame plates because of the frame plate windows.

By proper location of the apertures in a push rod and frame for the over-center springs, timing of a push rod, as well as loading, may be controlled. Also the length of a push rod will have an effect on timing.

The over-center spring arrangement is highly advantageous in the flexibility of practical designing for production. Thus, it is easy to change the location of the anchor openings for the ends of the springs and, in fact, it may be possible to provide several openings for selective anchoring of the ends of the springs. In this way, the timing characteristics of each push rod can be controlled by the simple expedient of determining where the ends of the springs are anchored. This, together with a choice of the strength of the springs, makes possible a high degree of design flexibility not present in prior structures. All of these advantages are obtained without in any way rendering the mechanism more expensive to manufacture or assemble or without requiring additional room.

Figure 15:
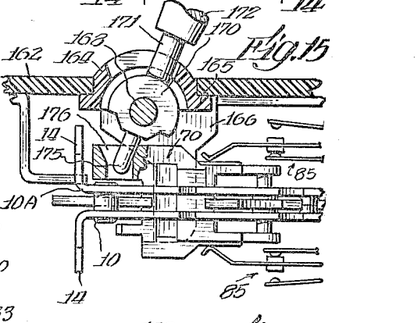
FIGURES 15 and 16 respectively are details, partly in section, illustrating modified means for actuating the push rods.

Referring now to FIGURE 15, a modification is illustrated wherein each push rod is actuated by a rocking lever. It is understood that the rocking lever arrangement may be used for operating one or all push rods. In FIGURE 15, bracket 160, preferably of metal, is rigidly secured to the frame of a push rod switch mechanism. Thus, as illustrated in FIGURE 15, one bracket, 160, is secured in suitable apertures in flange 14 of one of the frame plates. At the other, or what might be termed the rear edge of the frame (this being the edge where the contact stacks are secured), a bracket may be attached in any suitable manner to the frame. The brackets, one of which is illustrated by 160, carry panel plate 162, which may conveniently be of plastic or metal as desired.

Panel plate 162 has a slot in which is secured curved member 164 extending transversely of the switch mechanism, that is, generally parallel to the length of flanges 14. Curved member 164 is adapted to fit in the panel slot and has shoulders 165 for bearing against the inside face of panel plate 162. Curved member 164 is carried by metal end plates 166 which also support shaft 168. Shaft 168 loosely carries rockers 170 which may be rocked back and forth around shaft 168. Each rocker is located at a switch position and is provided with projecting lever portion 171 terminating in handle 172. Each rocker 170 also carries pin 175 which extends inwardly toward the switch mechanism and engages recess 176 in a switch cam block 70. This cam block is secured to a push rod, as previously described in connection with FIGURES 1 to 14 inclusive. Rocking handle 172 will operate a push rod. Rounded portion 164 is suitably slotted to accommodate the travel of finger 171 corresponding to the *up* and *down* positions of the push rod.

The arrangement between the various push rods may be as previously disclosed. It is clear that any handle portion 172 will correspond to a push button in the mechanism illustrated in FIGURES 1 to 14 inclusive and a lever will rock back and forth in the same manner as the push buttons will go up or down, depending upon the interlocking or inter-relationship between the various push rod stations.

Figure 16:
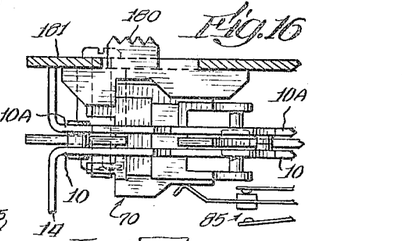

Referring now to FIGURE 16, a still further modified arrangement is illustrated wherein buttons 180 are slidably secured on panel plate 181. Panel plate 181 is generally similar to panel plate 162 of FIGURE 15 and may be secured to the switch mechanism, as a whole, in the same manner. Button 180, however, is directly secured to cam block 70 and may be clipped on or otherwise attached thereto. Thus, button 180 will move to the right, as illustrated in FIGURE 16, when a push rod is to be moved in from a normal position.

In both modifications illustrated in FIGURES 15 and 16, it is clear that the push rod portions can be cut down and avoid the necessity of having portions 56 of the push rod which are normally provided for carrying a push button.

Figures 17, 18, 19:
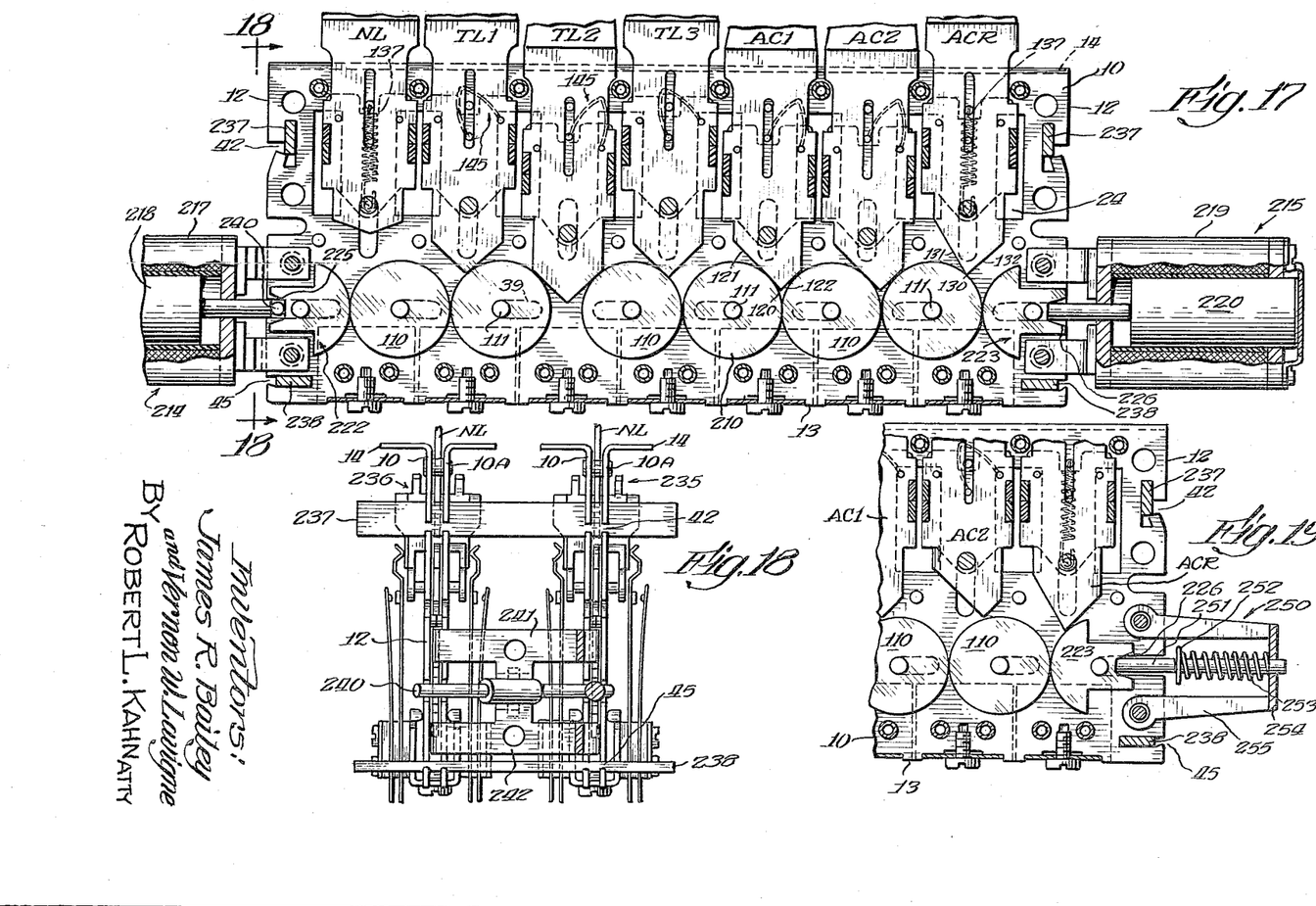
FIGURE 17 is an elevation with certain parts in section and certain parts broken away of a modified push rod switch arrangement, this modification being generally similar to the switch mechanism illustrated in FIGURES 1, 4 and 5 except that some changes have been made, so that all of the push rods except for the non-lock interact with each other and wherein electromagnets are used for controlling the degree and the nature of interaction.
FIGURE 18 is an end view taken on line 18—18 of FIGURE 17 illustrating the two tier or two-bank switch arrangement and the means for interconnecting the push rod means of the two banks.
FIGURE 19 shows a partial view of the push rod arrangement illustrated in FIGURE 17 except that instead of an electromagnet, a spring bias arrangement for the discs is provided.

Referring now to FIGURES 17 and 18, the switch arrangement there, insofar as the push rod mechanism is concerned, can be generally similar to the arrangement illustrated in FIGURES 1, 4 and 5 previously described. However, there is one important difference in that additional disc 210 is provided between adjacent discs 110 which are at stations designated respectively by the TL3 push button and the AC1 push button. By virtue of this arrangement, release button ACR, when depressed, will release not only AC1 and AC2, but any of the TL buttons which may be down. Thus, all push rods to the right of NL (as seen in these drawings) are functionally interconnected.

In addition to this difference, the switch arrangement or the push button arrangement illustrated in FIGURE 17 is provided with disc biasing means 214 and 215 respectively. As illustrated in FIGURE 17, these bias arrangements comprise solenoids 217 and 219, each having an armature or plunger 218 and 220 respectively. The plungers are normally free of any bias and are illustrated in a position where each of the solenoids 217 and 219 respectively are de-energized. When one or the other, but not both, windings are energized, plunger 218 or 220 will be pulled toward the associated discs.

In order for a plunger to operate on the discs, end discs 222 and 223 are provided, these being mutilated so that a circular portion is provided for cooperating with adjacent discs 110. The remainder of each of these mutilated discs, however, are shaped to provide slots 225 and 226 into which the pins carried by the plungers can project for engaging each disc. Referring for example to plunger 220, when solenoid winding 219 is energized, plunger 220 will be moved to the left and the corresponding pin will enter slot 226 and force mutilated disc 223 to the left as seen in FIGURE 17. It should be understood that the slot for the axle for mutilated disc 223 extends to the very edge of the frame plate (see slot 44 of FIGURE 12) so that mutilated disc 223 and the plunger pin can operate. Mutilated disc 223 will be moved leftward to the end of its slot. This will cause all of the other discs to move leftward, if possible, and will result in push button TL2, which is illustrated as being down, being forced up for unlocking. The remaining discs, including mutilated disc 222 beyond push rod for button TL2, will not be disturbed, since they are already as far left as they can go. Thus, energizing solenoid 219 will create release conditions for every push button except NL.

If solenoid 217 is energized instead of 219, only the TL1, TL2 and TL3 buttons, if locked, will be released. The AC group of buttons will not be affected, since discs to the right of TL2 are already as far to the right as they can be and will not be affected by energization of solenoid 214.

Thus, a selective control action for release is provided by having the bias means at one end or the other of the series of discs.

Referring to FIGURE 18, it will be noted that two banks or tiers of switches 235 and 236 are illustrated as being functionally joined together. These banks are supported by steel rods 237 and 238 which extend transversely of the banks and can join any number of switch banks together. These support members are accommodated by slots 42 and 45 of the frame plates. Means are provided for interlocking one bank of switches with the adjacent bank, and this means assumes the simple form of rocker pin 240 pivotally secured in support plates 241 and 242 which are carried by the frame plates. Rocker pin 240 is dimensioned to engage or enter slot 225 of mutilated disc 222.

It is only necessary for the solenoids to be provided in one bank, since the two banks are so interconnected that rocker pin 240 will provide a coupling for transferring the disc bias from one bank to the other. It is clear that solenoids 214 and 215 can be on the same end of the two switch banks (say, the right end as seen in FIGURE 17). Thus, the same effect will be secured as having the solenoids at opposite ends of the roller discs in one bank.

A plurality of banks of push button switches may be interconnected as desired. As illustrated in the left part of FIGURE 17, pin 240 is disposed in slot 225 so that the part of armature 218 will operate against slotted disc 222 through the end of pin 240.

Referring now to FIGURE 19, instead of a solenoid for bias purposes, spring means 250 can be provided. Obviously, such a spring imparts a permanent bias against a mutilated disc so that only one spring means should be provided at an end of a series of discs, or even interconnected discs. Such a spring bias as applied, for example, to a switch mechanism, illustrated in FIGURE 17, will affect both interlock and accumulative lock action and change them to momentary action. The solenoid means can be controlled so that when de-energized, there will be no bias. However, it may be that a permanent bias would be desirable, in which case the spring means generally shown in FIGURE 19 can be provided. This spring means includes pin 251 having collar 252 rigidly secured thereto. Coil spring 253 is disposed around pin 251 beyond the collar and the force of coil spring 253 is exerted between collar 252 and portion 254 of bracket 255 secured to a frame plate. It is evident that if spring 253 is compressed, the discs will be biased in the direction shown.

It will be evident that in the modification illustrated in FIGURE 17 or 19, there will be no necessity for an ACR station. Instead of an ACR button, a station similar to AC2 may be provided, thus providing for three accumulative lock stations.

What is claimed is:

1. In a push rod mechanism for use in electric switch gear or the like, the combination of a pair of generally flat, rigid support plates, means for securing said plates in opposed spaced relation so that one plate has its face opposite the face of the other plate, the distance between such faces constituting the spacing between said plates, a plurality of similar flat discs disposed between said plates, said discs being laterally offset from each other and having a thickness smaller than the space between said opposed plates, means for supporting said discs so that the centers of said discs extend along a straight line as viewed in plan, said disc supporting means permitting movement of said discs along said line of centers, a plurality of laterally offset parallel rods supported for limited longitudinal travel along lines perpendicular to the line of centers of said discs, at least certain of said rods having active end portions whose widths taper from normal width dimensions to points at the very tips of said rods, the width dimensions of said active rod portions being parallel to the plane of said discs and the rods being so oriented that the thickness of said active rod end portion is disposed between said support plates, the active rod portions tapering in width from said points to provide cam edges extending from said rod tips to the side edges of said active rod portions, the cam outline being determined by the tapering width of the active rod portions and being independent of the thickness thereof, means for biasing at least certain of said rods to each of two end positions defining the range of rod movement, one position corresponding to the *in* rod position and the other corresponding to the *out* rod position, said active rod portions provided with cam edges cooperating with the edges of said discs so that upon inward movement of a rod, the cam edge of such rod will engage at least one edge of a disc and the cam shape being such as to create a force tending to move such disc laterally along the line of centers of said disc, said construction making it possible by control of the cam shapes to provide for interlock, accumulative lock or accumulative lock release, said construction also providing for non-lock action by providing any desired push rod with a shortened active portion free of any cam edges so that no disc engagement is possible, wherein said two flat support plates have edges generally parallel to the line of disc movement but located beyond the disc edges in the direction away from the active rod portions, at least one U-shaped bracket adapted to be disposed against the edges of said plates, the sides of said U extending on the outside of said plates, switch contact leaf stacks carried by said U sides extending from the plate edges laterally offset from the rods, and means carried by each rod for cooperating with the contact leaf ends for operating said switches when said rod is moved longitudinally.

2. In a push rod mechanism for use in an electric switch gear and the like, the combination of a plurality of parallel, laterally offset push rods, said push rods having active end portions, a frame, means for mounting said push rods for limited independent longitudinal travel in said frame and means for biasing at least certain of said push rods to either of two end positions to determine their range of travel, the biasing means for each of said certain push rods including a generally V-shaped spring on each flat side thereof, means for hooking one end of each said V spring is said push rod, means for hooking the other end of each said V in said frame, the mounting of said springs permitting movement of each V arm about the free end thereof, the locations of the hooked ends of a V spring being selected so that a V spring functions as an over-center spring to maintain the push rod in either end position as a stable biased position, the two V springs on each side of a push rod making up a pair of springs moving in opposite directions at any time and tending to balance the side thrust of each spring against the push rod.

3. In a push rod mechanism, the combination of a plurality of parallel, laterally offset push rods, a pair of substantially flat plates constituting a frame for said mechanism, means for mounting said push rods in said frame for longitudinal movement over a predetermined range, said frame plates having parallel windows longitudinally of the push rods for exposing the side portions of said push rod, each push rod being disposed between the frame plates with the width of each push rod being generally parallel to the planes of said plates, at least one cam block secured to a push rod, said cam block being disposed on the outside of said frame plate and having fingers extending through the windows of said frame plate for attachment to said push rod, such cam block being movable with said push rod, at least one contact leaf stack carried by said frame plates and having an operating end portion of a contact leaf resting upon said cam block, said contact leaves and cam block cooperating for changing the circuit conditions of a contact leaf stack upon movement of the push rod carrying the cooperating cam block.

4. The construction according to claim 3 wherein a push rod has cam blocks extending from opposite sides of the frame plate toward each other and wherein contact stacks are carried by said frame for cooperation with the two cam blocks of a push rod.

5. The construction according to claim 3 wherein said cam block is made of a plastic electrically insulating material having a low coefficient of friction for relative movement between said cam block and the cooperating end of a contact leaf spring.

6. In a push rod mechanism for use in electric switch gear or the like, the combination of a pair of generally flat, rigid support plates, means for securing said plates in opposed spaced relation so that one plate has its face opposite the face of the other plate, the distance between such faces constituting the spacing between said plates, a plurality of similar flat discs disposed between said plates, said discs being laterally offset from each other and having a thickness less than the space between said opposed plates, means for supporting said discs so that the centers of said discs extend along a straight line as viewed in plan, said disc supporting means permitting movement of said discs along said line of centers, a plurality of laterally offset parallel push rods supported for limited longitudinal travel along lines perpendicular to the line of centers of said discs, at least certain of said rods having active end portions whose widths taper from normal width dimensions to points at the very tips of said rods, the width dimensions of said active rod portions being parallel to the plane of said discs and the rods being so oriented that the thickness of said active rod end portion is disposed between said support plates, the active rod portions tapering in width from said points to provide cam edges extending from said rod tips to the side edges of said active rod portions, the cam outlined being determined by the tapering width of the active rod portions and being independent of the thickness thereof, means for biasing at least certain of said rods to each of two end positions defining the range of rod movement, one position corresponding to the *in* rod position and the other corresponding to the *out* rod position, said active rod portions provided with cam edges cooperating with the edges of said discs so that upon inward movement of a rod, the cam edge of such rod will engage at least one edge of a disc and the cam shape being such as to create a force tending to move such disc laterally along the line of centers of said disc, said biasing means for certain of said rods including at least one generally V-shaped spring, means for pivotally securing the free end of each of the V springs to a push rod and frame plate respectively, said free ends in each end position of the corresponding rod being on a line which is at an acute angle to the line of centers of said discs to provide an over-center spring action, the V of the spring rocking against the flat face of the plate with rod movement, said entire construction providing for interlock, accumulative lock or accumulative lock release by control of the cam shape and providing an overall structure which is compact.

7. The construction according to claim 6 wherein the frame plates have windows longitudinally of each push rod, said windows exposing the push rod side portions, a cam block disposed on the outside of the frame adjacent the over-center spring, said cam block including fingers extending through the windows of said frame for coupling to the push rod to be movable therewith, a cam block being movable toward or from the line of disc centers, at least one contact leaf stack supported on said frame at a portion thereof which is beyond the disc centers but is longitudinally aligned with the corresponding push rod, said cam block and contact leaves of said stack cooperating for electric switch action with movement of said rod from one end position to another.

8. The construction according to claim 7 wherein an over-center spring is provided on each side of the frame and wherein each over-center spring is covered at least in part by a cam block.

9. In a switch mechanism, the combination of two flat plates of substantially rigid material, means for maintaining said plates in parallel opposed relation with the sides disposed opposite each other and spaced a distance of the same general order as the thickness of a plate, said two plates forming a frame, said frame having two opposed, generally parallel edges, a plurality of push rods disposed between said plates in said frame for individual longitudinal movement along lines normal to said two edges, each rod having one end portion adjacent one frame edge and having the other end portion extending toward the other frame edge, cam blocks carried by and movable with said rods, U-shaped brackets adapted for mounting at the other edge of said frame and dimensioned so that the sides of each U overlie the outside of the frame plates, at least one leaf contact stack secured to a bracket and extending from said bracket generally parallel to the frame plate surfaces and extending toward the one edge of said frame for selective cooperation with said cam blocks and means at the bight of each U bracket extending into said frame for attaching each bracket to said frame whereby leaf contact stacks can be serviced, removed or added from the rear edge of a contact frame at any time.

10. The construction according to claim 9 wherein at least one frame plate is provided with embossings inwardly directed toward the opposing frame plate at regions between said two edges and wherein each frame plate is provided with outwardly directed embossings for receiving a threaded screw passing through the bight of said U of a bracket, said threaded screw cooperating with the outwardly disposed embossings for securing said bracket at said other edge, the first named inwardly directed embossings functioning to substantially control the tendency for buckling of said frame plates from the insertion of a screw into outwardly directed embossings, thus tending to spread said frame plates apart at that particular region.

11. The construction according to claim 10 wherein said mechanism includes flat discs disposed between said frame plates adjacent said other edge for cooperation with said push rods for providing a desired functional interaction between various push rods.

12. In a push rod mechanism for use with electric switch gear and the like, the combination of two generally flat frame plates disposed in opposed face-to-face relation, means for maintaining said plates spaced from each other a distance which is of the same general order as the thickness of each plate, a plurality of flat, parallel, laterally offset push rods disposed between said two plates with the thickness of each push rod being somewhat less than the spacing between the plates to permit said push rods to move between said plates, means for mounting said push rods in said plates to be longitudinally movable, a plurality of discs of similar diameter disposed between said frame plates adjacent the active ends of said push rods, said discs having their centers along a line normal to the lines of movement of said push rods, means providing for movement of said discs along the line of centers and means including cams carried by the ends of said push rods for cooperating with the edges of said discs for securing displacement of desired discs along their line of centers, the shapes of said cams and the groupings of said discs all cooperating to obtain selective interlock or accumulative lock action, as desired, said discs being arranged so that they can all be tangent to each other and means for biasing an end disc to one end position, said end disc when so biased moving successive discs to assume positions for tangency.

13. The mechanism according to claim 12 wherein said bias means include solenoids, one solenoid when energized tending to urge all said discs in one direction, the other solenoid when energized tending to urge said discs in reverse direction.

14. The construction according to claim 12 wherein at least one end disc is slotted and wherein said bias means includes a pin for engaging said slot to move said disc.

15. In a push rod mechanism for use with electric switch gear and the like, the combination of two generally flat frame plates disposed in opposed face-to-face relation, means for maintaining said plates spaced from each other a distance which is of the same general order as the thickness of each plate, a plurality of flat, parallel, laterally offset push rods disposed between said two plates with the thickness of each push rod being somewhat less than the spacing between the plates to permit said push rods to move between said plates, means for mounting said push rods in said plates to be longitudinally movable, a plurality of discs of similar diameter disposed between said frame plates adjacent the active ends of said push rods, said discs having their centers along a line normal to the lines of movement of said push rods, means providing for movement of said discs along the line of centers and means including cams carried by the ends of said push rods for cooperating with the edges of said discs for securing displacement of desired discs along their line of centers, the shapes of said cams and the groupings of said discs all cooperating to obtain selective interlock or accumulative lock action, as desired, said discs being arranged so that at least certain of said discs can be tangent to each other, an end disc being mutilated to provide a slot away from the disc adjacent said end disc, a second bank including frame plates, rods and discs, means for securing said two banks in opposed face-to-face relation, said second bank having a mutilated disc opposite the mutilated disc of said first bank, a coupling pin supported between said two banks and extending into the slots of two mutilated discs, said coupling pin being adapted to communicate a force from one mutilated disc to the other mutilated disc so that effective coupling between the two banks for interlock or accumulative lock is obtained.

16. In a push rod mechanism for use in electric switch gear or the like, the combination of a pair of generally flat, rigid support plates, means for securing said plates in opposed spaced relation so that one plate has its face opposite the face of the other plate, the distance between such faces constituting the spacing between said plates, a plurality of similar flat discs disposed between said plates, said discs being laterally offset from each other and having a thickness less than the space between said opposed plates, means for supporting said discs so that the centers of said discs extend along a straight line as viewed in plan, said disc supporting means permitting movement of said discs along said line of centers, a plurality of laterally offset parallel push rods supported for limited longitudinal travel along lines perpendicular to the line of centers of said discs, at least certain of said rods having active end portions whose widths taper from normal width dimensions to points at the very tips of said rods, the width dimensions of said active rod portions being parallel to the plane of said discs and the rods being so oriented that the thickness of said active rod end portion is disposed between said support plates, the active rod portions tapering in width from said points to provide cam edges extending from said rod tips to the side edges of said active rod portions, the cam outline being determined by the tapering width of the active rod portions and being independent of the thickness thereof, means for biasing at least certain of said rods to each of two end positions defining the range of rod movement, one position corresponding to the *in* rod position and the other corresponding to the *out* rod position, said active rod portions provided with cam edges cooperating with the edges of said discs so that upon inward movement of a rod, the cam edge of such rod will engage at least one edge of a disc and the cam shape being such as to create a force tending to move such disc laterally along the line of centers of said disc, said entire construction providing for interlock, accumulative lock or accumulative lock release by control of the cam shape and providing an overall structure which is compact.

17. A push rod mechanism comprising a pair of flat plates disposed in opposed, spaced, parallel relation, a plurality of push rods having flat active end portions, means for mounting said rods between said plates in parallel laterally offset relation for limited longitudinal travel between *in* and *out* positions, means for retaining each push rod in stable condition at each of its end travel positions, a plurality of flat discs having the same diameter, means for supporting said discs between said plates in laterally offset relation with the disc centers lying along a straight line normal to the line of travel of said push rods, said disc supporting means providing for limited disc lost motion along the line of centers, said flat rod portions being movable toward and away from the line of disc centers, active end portions of said rods, when said rods are moved toward the discs, being engageable with the edges of said discs and the center line of each push rod intersecting the line of disc centers at points other than the centers of any discs, at least certain adjacent push rods constituting an accumulative rod group, each accumulative push rod having its respective active end portions nonsymmetrical with respect to the longitudinal center line of such push rod, said terminating end having one part shaped and dimensioned for providing a cam edge for engaging a cooperating disc edge when said rod is moved toward said disc to an *in* position, the remaining end part of said push rod being shaped to clear the edge of an adjacent disc when said push rod is in an *in* position, said accumulative rods being free of interlocking action and permitting any or all of said accumulative push rods to remain in an *in* position simultaneously, and an interlock lock release rod adjacent said accumulative lock rod group, said lock release rod having its active end edge provided with a cooperating disc engaging edge for moving said cooperating disc in a direction opposite to disc movement resulting from accumulative lock action when one or more accumulative rods are moved to an *in* position, said plates, rod mounting means accommodating push rods having differently shaped active end edges for providing an overall mechanism which can have accumulative lock and release with or without rod interlock or independent rod action, all by selection of properly shaped rods.

18. The mechanism according to claim 17 wherein push rods having symmetrical arrowhead shaped active edges are included for interlock action whereby one interlock push rod when moved to an *in* position forces another interlock rod out from an *in* position, said interlock action preventing more than one push rod in the interlock group of rods being in an *in* position at any one time, said interlock group of rods cooperating with discs which are adjacent to each other to form an interlock group, said construction as a whole permitting establishing an operating relationship between the accumulative lock group and the interlock group by having a continuous group of cooperating discs or by separating the functioning of said two groups by simply omitting a disc between the two groups of push rods so that any cooperative rod and disc action in one group will not be transmitted to the rod and disc action of the other group.

References Cited by the Examiner
UNITED STATES PATENTS

| 2,381,978 | 8/1945 | Mathes | 200—159 X |
| 2,773,139 | 12/1956 | Forstrom et al. | 200—5 |
| 3,068,717 | 12/1962 | Meli et al. | 74—483 |
| 3,142,198 | 7/1964 | Williams | 200—5 X |
| 3,194,899 | 7/1965 | Stock | 200—5 |

ROBERT K. SCHAEFER, *Primary Examiner.*

J. R. SCOTT, *Assistant Examiner.*